US012667905B2

(12) United States Patent     (10) Patent No.:   US 12,667,905 B2
Taniguchi et al.     (45) Date of Patent:    Jun. 30, 2026

(54) MANUFACTURING APPARATUS

(71) Applicant: Panasonic Intellectual Property Management Co., Ltd., Kadoma (JP)

(72) Inventors: Yasushi Taniguchi, Osaka (JP);
Kazutaka Nishikawa, Nara (JP);
Masahiro Nakajo, Osaka (JP);
Masanori Kuroda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 18/845,585

(22) PCT Filed: Mar. 6, 2023

(86) PCT No.: PCT/JP2023/008393

§ 371 (c)(1),
(2) Date: Sep. 10, 2024

(87) PCT Pub. No.: WO2023/176557

PCT Pub. Date: Sep. 21, 2023

(65) Prior Publication Data

US 2025/0205808 A1     Jun. 26, 2025

(30) Foreign Application Priority Data

Mar. 16, 2022     (JP) ................................. 2022-041569

(51) Int. Cl.
B23K 20/04       (2006.01)
B23K 20/26       (2006.01)
(Continued)

(52) U.S. Cl.
CPC .............. B23K 20/04 (2013.01); B23K 20/26 (2013.01); *B23K 2101/16* (2018.08); *B23K 2101/36* (2018.08); *B23K 2103/18* (2018.08)

(58) Field of Classification Search
CPC .... B23K 20/04; B23K 20/26; B23K 2101/16; B23K 2101/36; B23K 2103/18;
(Continued)

(56) References Cited

U.S. PATENT DOCUMENTS

2004/0209163 A1 *   10/2004   Watanabe ........... H01M 50/562
                                   429/178
2014/0246408 A1 *   9/2014   Dai ..................... H01M 50/528
                                   219/118
(Continued)

FOREIGN PATENT DOCUMENTS

CN       102689089 A   *   9/2012   ......... B23K 15/0006
CN       101910434 B   *   7/2015   ............. C22C 21/00
(Continued)

OTHER PUBLICATIONS

Translation of JPH0393156A (Year: 1991).*
(Continued)

*Primary Examiner* — Sonya M Sengupta
(74) *Attorney, Agent, or Firm* — WHDA, LLP

(57) ABSTRACT

A first pressure bonding roller 110 and a second pressure bonding roller 112 have a cylindrical shape. A first metal foil 200 and a second metal foil 202 are inserted between the first pressure bonding roller 110 and the second pressure bonding roller 112. The first metal foil 200 and the second metal foil 202 are pressure bonded by a rotation of the first pressure bonding roller 110 and the second pressure bonding roller 112. The first pressure bonding roller 110 includes a D-cut surface at least in a portion of the cylindrical shape. A protrusion is provided in each of two boundaries between a side surface and the D-cut surface of the cylindrical shape in the first pressure bonding roller 110.

10 Claims, 6 Drawing Sheets

(51) Int. Cl.
  B23K 101/16 (2006.01)
  B23K 101/36 (2006.01)
  B23K 103/18 (2006.01)

(58) Field of Classification Search
  CPC ............. H01M 4/0404; H01M 4/0435; H01M 4/1395; H01M 4/661
  See application file for complete search history.

(56) References Cited

U.S. PATENT DOCUMENTS

| | | | |
|---|---|---|---|
| 2016/0285068 A1* | 9/2016 | Beugnon | H01M 10/058 |
| 2021/0135274 A1* | 5/2021 | Chae | H01M 10/0525 |
| 2023/0035654 A1* | 2/2023 | Reingruber | B23K 26/21 |
| 2025/0205808 A1* | 6/2025 | Taniguchi | B23K 20/04 |

FOREIGN PATENT DOCUMENTS

| | | | | |
|---|---|---|---|---|
| CN | 109689273 A | * | 4/2019 | H01M 50/566 |
| CN | 116135398 A | * | 5/2023 | H01M 10/0525 |
| CN | 120674699 A | * | 9/2025 | H01M 10/054 |
| DE | 102019108876 A1 | * | 10/2019 | H01M 4/0471 |
| DE | 102018221843 A1 | * | 6/2020 | B23K 20/106 |
| DE | 112013004230 B4 | * | 1/2026 | H01M 50/534 |
| EP | 3944922 A1 | * | 2/2022 | B23K 26/26 |
| JP | H06-150935 A | | 5/1994 | |
| JP | 2006320917 A | * | 11/2006 | |
| JP | 2006324323 A | * | 11/2006 | |
| JP | 4877321 B2 | * | 2/2012 | H01G 11/82 |
| JP | 2013165010 A | * | 8/2013 | |
| JP | 2014140890 A | * | 8/2014 | B23K 15/00 |
| JP | 6176524 B2 | * | 8/2017 | H01M 50/505 |
| JP | 2021048052 A | * | 3/2021 | |
| JP | 2021192347 A | * | 12/2021 | |
| KR | 20200011374 A | * | 2/2020 | H01M 4/75 |
| KR | 20220156561 A | * | 11/2022 | B23K 26/0734 |
| KR | 102872013 B1 | * | 10/2025 | B32B 15/01 |
| WO | WO-2010004132 A1 | * | 1/2010 | B23K 9/23 |
| WO | WO-2016034204 A1 | * | 3/2016 | H01M 50/169 |
| WO | WO-2022113023 A1 | * | 6/2022 | B23K 20/02 |
| WO | WO-2022235159 A1 | * | 11/2022 | H01M 4/134 |

OTHER PUBLICATIONS

Translation of JPH09330707A (Year: 1997).*
International Search Report dated May 23, 2023, issued in counterpart International Application No. PCT/JP2023/008393 (5 pages).

* cited by examiner

180

182

184

MANUFACTURING APPARATUS

CROSS REFERENCE TO RELATED APPLICATIONS

This Application is the National Stage of International Application No. PCT/JP2023/008393, filed on Mar. 6, 2023, which claims priority from Application No. 2022-041569 filed on Mar. 16, 2022 in Japan. The entire contents of these applications are incorporated herein by reference in their entirety.

TECHNICAL FIELD

The present disclosure relates to a manufacturing apparatus that manufactures an electrode plate.

BACKGROUND ART

A negative electrode current collector in a secondary battery such as a lithium ion battery is manufactured by arranging a lithium foil on a copper foil. For example, a lithium foil is cut to a predetermined dimension, holes are drilled at regular intervals on a negative electrode current collector surface, an adhesive is applied to the hole, and the cut lithium foil is transferred to the hole of the negative electrode current collector (see, for example, Patent Literature 1).

RELATED-ART LITERATURE

Patent Literature

Patent Literature 1: JP H6-150935

SUMMARY OF INVENTION

Technical Problem

When the cut lithium foil is transferred to the hole of the negative electrode current collector, misalignment that occurs when the lithium foil is transferred to the hole of the negative electrode current collector presents a problem.

The present disclosure addresses the issue described above, and a purpose thereof is to provide a technology for improving the accuracy of manufacturing of an electrode plate.

Solution to Problem

A manufacturing apparatus according to an embodiment of the present disclosure includes: a pair of pressure bonding rollers each having a cylindrical shape. A first metal foil and a second metal foil stacked are inserted between the pair of rollers, the first metal foil and the second metal foil are pressure bonded by a rotation of the pair of pressure bonding rollers, and the pair of pressure bonding rollers include a first pressure bonding roller provided on a side of the first metal foil and a second pressure bonding roller different from the first pressure bonding roller. The first pressure bonding roller includes a D-cut surface at least in a portion of the cylindrical shape. A protrusion is provided in each of two boundaries between a side surface and the D-cut surface of the cylindrical shape in the first pressure bonding roller.

Advantageous Effects of Invention

According to the present disclosure, the accuracy of manufacturing of an electrode plate can be improved.

DESCRIPTION OF EMBODIMENTS

Embodiment 1

Figures 1A, 1B:
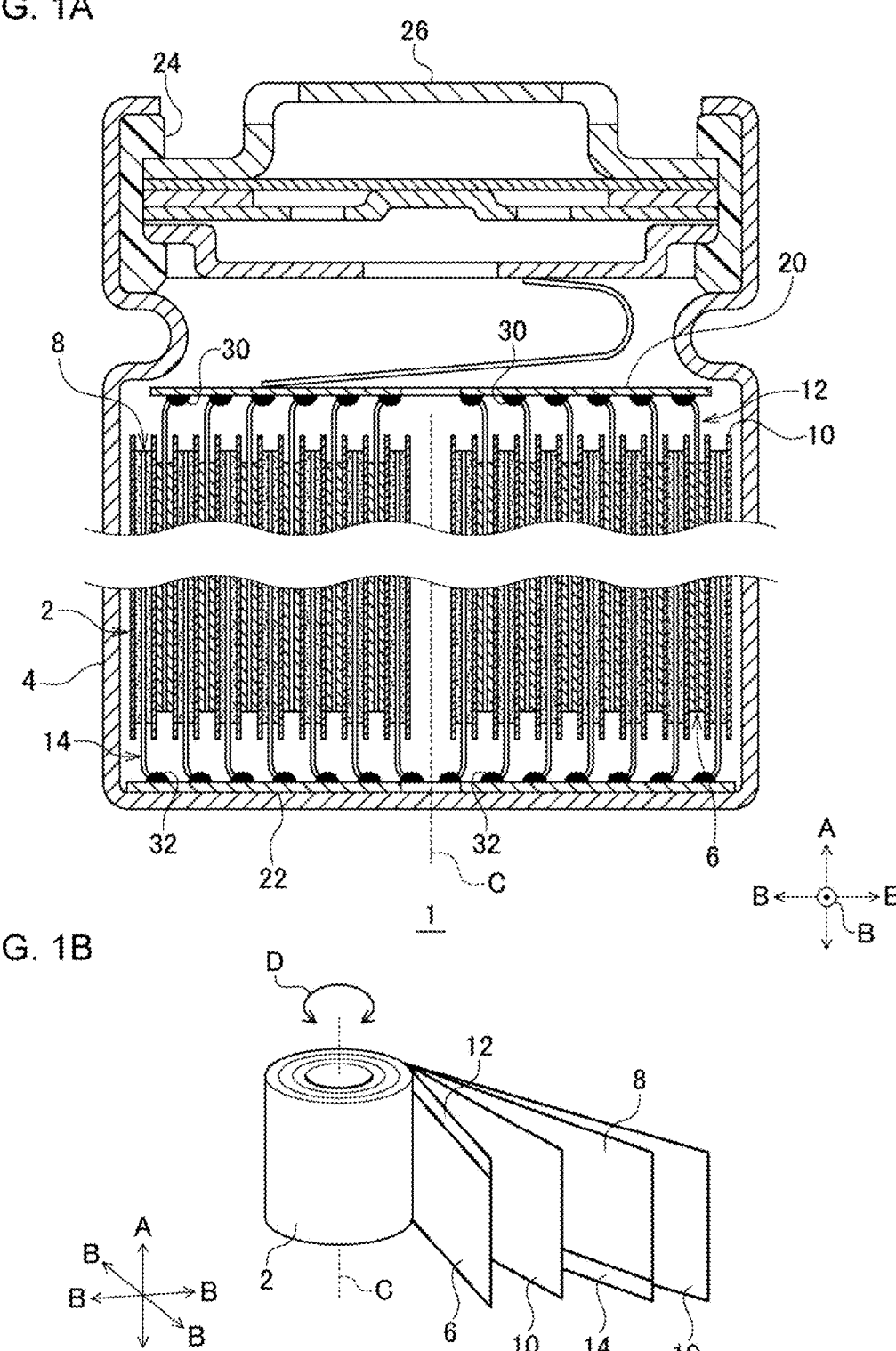
FIGS. 1A-1B show the structure of a cylindrical battery 1 according to embodiment 1.

Hereinafter, the present disclosure will be described based on preferred embodiments with reference to drawings. The embodiments do not limit the scope of the present disclosure but exemplify the disclosure. Not all of the features and the combinations thereof described in the embodiments are necessarily essential to the present disclosure. Identical or like constituting elements, members, processes shown in the drawings are represented by identical symbols and a duplicate description will be omitted as appropriate. The scales and shapes of the parts shown in the drawings are defined for convenience's sake to make the explanation easy and shall not be interpreted in a limitative manner unless otherwise specified. Terms like "first", "second", etc. used in the specification and claims do not indicate an order or importance by any means unless specified otherwise and are used to distinguish a certain feature from the others. Those of the members that are not material to the description of the embodiments are omitted in the drawings.

Hereinafter, (1) the structure of a cylindrical battery, (2) the structure of manufacturing apparatus and manufacturing process will be described in that order.

(1) Structure of Cylindrical Battery

FIGS. 1A-1B show the structure of a cylindrical battery 1. FIG. 1A is a cross-sectional view of the cylindrical battery 1, and FIG. 1B is an exploded perspective view of an electrode group 2. The cylindrical battery 1 is, for example, a rechargeable secondary battery such as a lithium ion battery, a nickel-metal hydride battery, and a nickel-cadmium battery. The cylindrical battery 1 by way of one example has a structure in which the electrode group 2 is stored in an outer can 4 along with an electrolytic solution (not shown). The electrode group 2 is cylindrical in shape by way of one example and, as shown in FIG. 1B, has a winding structure in which a belt-like first electrode plate 6 and a belt-like second electrode plate 8 are stacked, sandwiching a belt-like separator 10, and are wound in a spiral shape. In this embodiment, the first electrode plate 6 is the positive electrode plate and the second electrode plate 8 is the negative electrode plate, but the polarity of the first electrode plate 6 and the second electrode plate 8 may be reversed.

The separator 10 is formed by a microporous film made of, by way of one example, a polypropylene resin or the like.

The first electrode plate 6 and the second electrode plate 8 have a structure in which an electrode active material layer is stacked on a current collector. In the case of a general lithium ion secondary battery, the current collector is comprised of an aluminum foil or the like when it is a positive electrode and is comprised of a copper foil or the like when it is a negative electrode. The electrode active material layer can be formed by applying an electrode mixture material to the surface of the current collector by a known coating apparatus and drying and rolling the material. The electrode mixture material is obtained by kneading materials including an electrode active material, a binder, a conductive material, etc. in a dispersion medium and uniformly dispersing the materials. In the case of a general lithium ion secondary battery, the electrode active material is lithium cobalt oxide, lithium iron phosphate, or the like when it is a positive electrode and is graphite or the like when it is a negative electrode.

The first electrode plate 6 has a first electrode core member 12 that is not coated with an electrode mixture material at the end on one side in the width direction A (a direction that intersects the longitudinal direction of the belt). Hereinafter, the width direction A is also referred to as "vertical direction". Further, denoting the side of the first electrode plate 6 on which the first electrode core member 12 is disposed by the "upper side", the side of the first electrode plate 6 on which the first electrode core member 12 is not disposed is called the "lower side". The first electrode core member 12 is an exposed portion of the current collector of the first electrode plate 6 in which the electrode active material layer is not stacked. Further, the second electrode plate 8 has a second electrode core member 14 not coated with an electrode mixture material on the other side in the width direction A, i.e., at the end opposite to the side where the first electrode core member 12 protrudes. It can be said that the second electrode core member 14 is disposed on the lower side of the second electrode plate 8. The second electrode core member 14 is an exposed portion of the current collector of the second electrode plate 8 in which the electrode active material layer is not stacked.

As described above, the electrode group 2 has a structure in which the first electrode plate 6 and the second electrode plate 8 are wound. For this reason, a plurality of ends of the first electrode plate 6 and the second electrode plate 8 in the width direction A are arranged in the radial direction B of the electrode group 2. Therefore, the electrode group 2 includes a plurality of first electrode core members 12 arranged in the radial direction B and a plurality of second electrode core members 14 arranged in the radial direction B.

In the electrode group 2, the ends (the first electrode core member 12) of a plurality of first electrode plates 6 arranged in the radial direction B are bent in the radial direction B. For example, each first electrode core member 12 is bent toward the central axis C of the winding of the electrode group 2, i.e., bent inward in the radial direction B. The central axis C of the winding is, for example, the geometric center of the outline of the electrode group 2 seen in the width direction A, i.e., the geometric center of the outline of the shape of the electrode group 2 projected in the width direction A. Further, in the electrode group 2, the ends (the second electrode core member 14) of a plurality of second electrode plates 8 arranged in the radial direction B are bent in the radial direction B. For example, each second electrode core member 14 is bent toward the central axis C of the winding.

A first current collector plate 20 is provided on the side in the electrode group 2 where the first electrode core member 12 protrudes, i.e., toward the upper side of the electrode group 2. The first current collector plate 20 is made of, for example, aluminum or the like. The first electrode core member 12 of the plurality of first electrode plates 6 bent on the upper side are placed in surface contact with the first current collector plate 20. By bending the first electrode core member 12 of each first electrode plate 6, the contact area between each first electrode core member 12 and the first current collector plate 20 increases. Laser welding, etc. of the first current collector plate 20 and the first electrode core member 12 forms a first welded part 30. Thereby, the first electrode plate 6 of each winding layer and the first current collector plate 20 are joined to each other in the first welded part 30.

A second current collector plate 22 is provided on the side in the electrode group 2 where the second electrode core member 14 protrudes, i.e., on the lower side of the electrode group 2. The second current collector plate 22 is made of, for example, copper, nickel, nickel-plated copper, nickel-plated iron, and the like. The second electrode core member 14 of the plurality of second electrode plates 8 bent on the lower side are in surface contact with the second current collector plate 22. By bending the second electrode core member 14 of each second electrode plate 8, the contact area between each second electrode core member 14 and the second current collector plate 22 increases. Laser welding, etc. of the second current collector plate 22 with the second electrode core member 14 forms a second welded part 32. Thereby, the second electrode plate 8 of each winding layer and the second current collector plate 22 are joined to each other in the second welded part 32.

The electrode group 2 to which the first current collector plate 20 and the second current collector plate 22 are joined is stored in the bottomed cylindrical outer can 4 along with the electrolytic solution. The outer can 4 is made of, for example, copper, nickel, iron, an alloy thereof, or the like. The second current collector plate 22 is joined to the inner bottom surface of the outer can 4 by welding or the like. The first current collector plate 20 is joined to a sealing plate 26 made of the same metal as the outer can 4 by welding or the like. The sealing plate 26 is fitted into the opening of the outer can 4 via an insulating gasket 24. Thereby, the electrode group 2 and the electrolytic solution are sealed in the outer can 4.

(2) Structure of Manufacturing Apparatus and Manufacturing Process

Figure 2:
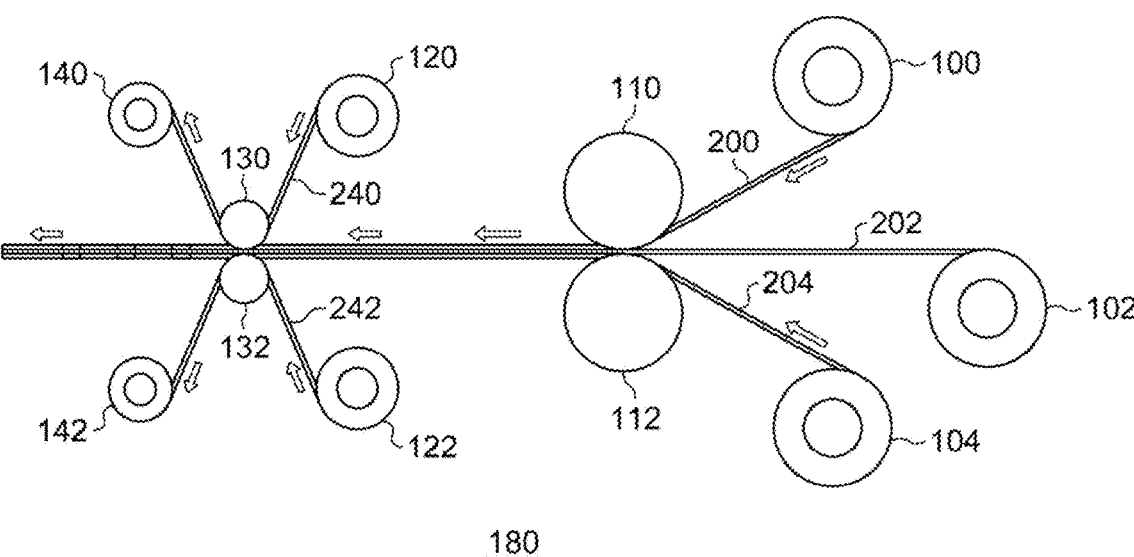
FIG. 2 is a side view showing a structure of a manufacturing apparatus according to embodiment 1.

Hereinafter, an apparatus and a process for manufacturing a second electrode plate 8, which is a negative electrode plate, will be described. FIG. 2 is a side view showing a structure of a manufacturing apparatus 180. A first metal foil roll member 100 has a first metal foil 200 wrapped around it. The first metal foil 200 is a lithium foil (about 10 μm) that is a negative electrode active material. The second metal foil roll member 102 has a second metal foil 202 wrapped around it. The second metal foil 202 is a copper foil (about 13 μm) that is a negative electrode current collector. The third metal foil roll member 104 has a third metal foil 204 wrapped around it. The third metal foil 204 is a lithium foil (about 10 μm) that is a negative electrode active material. Therefore, the first metal foil 200 and the second metal foil 202 are different metals, and the first metal foil 200 and the third metal foil 204 are the same metal. For example, the width of the second metal foil 202 is narrower than the width of the first metal foil 200 and the width of the third metal foil 204.

The first metal foil 200 is drawn from the first metal foil roll member 100, the second metal foil 202 is drawn from the second metal foil roll member 102, and the third metal foil 204 is drawn from the third metal foil roll member 104. The first metal foil 200, the second metal foil 202, and the third metal foil 204 travel toward a first pressure bonding roller 110 and a second pressure bonding roller 112 forming a pair of pressure bonding rollers. In that process, the first metal foil 200, the second metal foil 202, and the third metal foil 204 are stacked in that order from top to bottom.

The first pressure bonding roller 110 and the second pressure bonding roller 112 are arranged in the vertical direction. To describe it specifically, the first pressure bonding roller 110 is provided on the side of the first metal foil 200, and the second pressure bonding roller 112 is provided on the side of the third metal foil 204. The first metal foil 200, the second metal foil 202, and the third metal foil 204 stacked are inserted between the first pressure bonding roller 110 and the second pressure bonding roller 112. The first pressure bonding roller 110 and the second pressure bonding roller 112 have a cylindrical shape and are rotatable. The first metal foil 200, the second metal foil 202, and the third metal foil 204 are pressure bonded by the rotation of the first pressure bonding roller 110 and the second pressure bonding roller 112.

Figure 3:
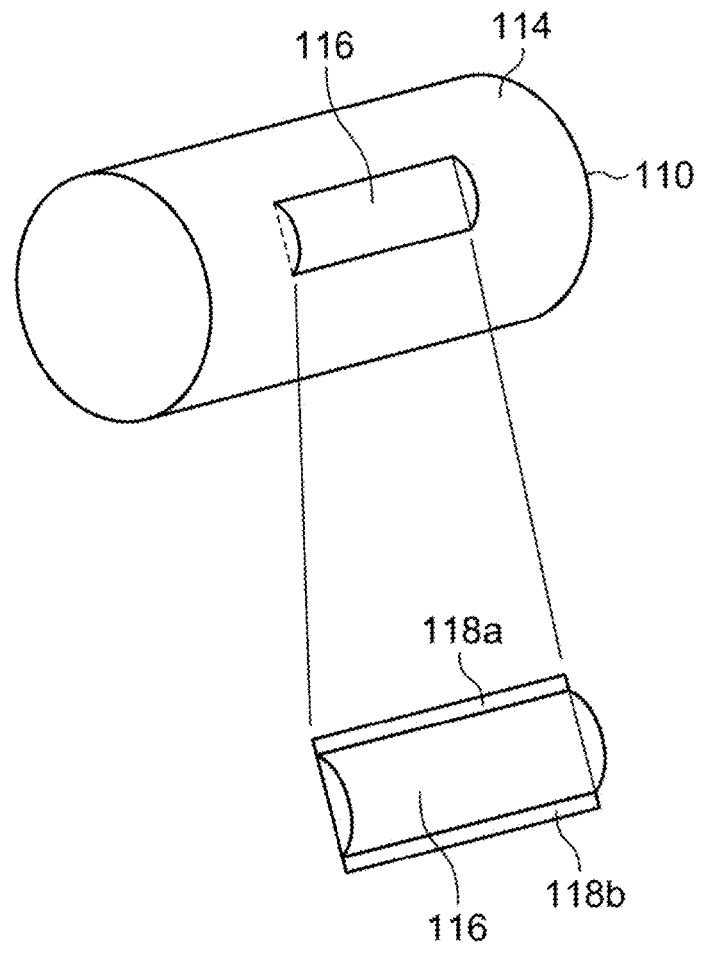
FIG. 3 is a perspective view showing a structure of the first pressure bonding roller of FIG. 2.

FIG. 3 is a perspective view showing a structure of the first pressure bonding roller 110. The first pressure bonding roller 110 has a cylindrical shape and is covered with a side surface 114. A D-cut surface 116 is formed on a portion of the side surface 114. A first protrusion 118a and a second protrusion 118b are respectively provided in the two boundaries between the side surface 114 and the D-cut surface 116. The first protrusion 118a and the second protrusion 118b are collectively referred to as a protrusion 118. The protrusion 118 has, for example, a semi-cylindrical shape or a triangular prism shape. The height of the protrusion 118 from the side surface 114 is 20% to 70% and, preferably, 50%, of the thickness of the first metal foil 200. The height of the protrusion 118 may be varied by a spring.

The second pressure bonding roller 112 also has the same structure as the first pressure bonding roller 110. The second pressure bonding roller 112 is provided with a third protrusion (not shown) similar to the first protrusion 118a and with a fourth protrusion (not shown) similar to the second protrusion 118b. The third and fourth processes are collectively referred to as a protrusion. The height of the protrusion of the second pressure bonding roller 112 is 20% to 70% and, preferably, 50%, of the thickness of the third metal foil 204. Reference is made back to FIG. 2.

In the first pressure bonding roller 110 and the second pressure bonding roller 112, the timing of pressure bonding by the protrusion 118 of the first pressure bonding roller 110 and the timing of pressure bonding by the protrusion (not shown) of the second pressure bonding roller 112 are synchronized. This is equivalent to the time when the D-cut surface 116 of the first pressure bonding roller 110 pressure-bonds the first metal foil 200 and the time when the D-cut surface (not shown) of the second pressure bonding roller 112 pressure-bonds the third metal foil 204 coinciding. It can also be said that the time when the first protrusion 118a of the first pressure bonding roller 110 pressure-bonds the first metal foil 200 coincides with the time when the third protrusion of the second pressure bonding roller 112 pressure-bonds the third metal foil 204. It can also be said that the time when the second protrusion 118b of the first pressure bonding roller 110 pressure-bonds the first metal foil 200 coincides with the time when the fourth protrusion of the second pressure bonding roller 112 pressure-bonds the third metal foil 204. For such synchronization of the first pressure bonding roller 110 and the second pressure bonding roller 112, a vertical alignment jig is used, but a description thereof is omitted here.

Figure 4:
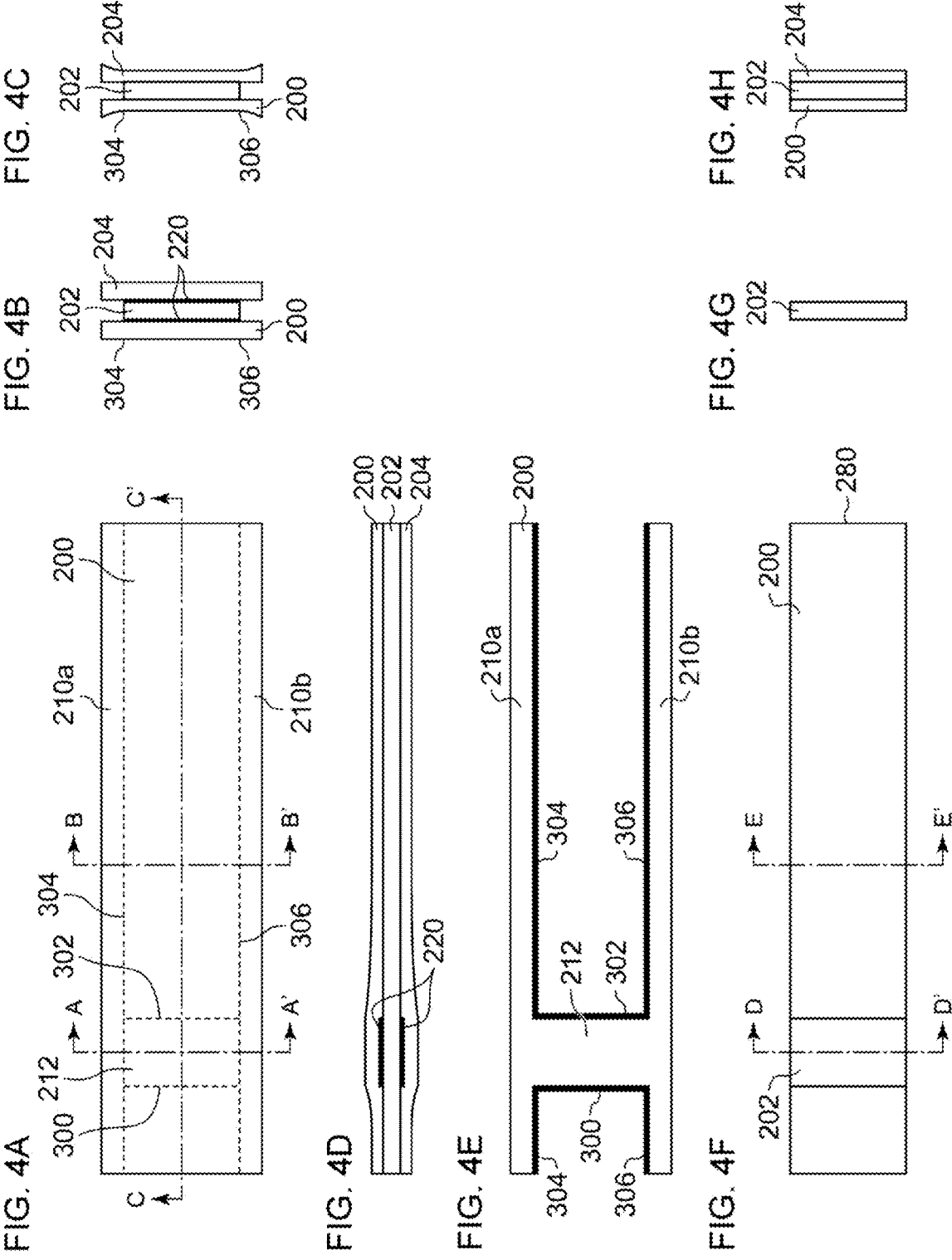
FIGS. 4A-4H show a structure of a laminated body manufactured by the manufacturing apparatus of FIG. 2.

FIGS. 4A-4H show a structure of a laminated body manufactured by the manufacturing apparatus 180. FIG. 4A is a top view of the first metal foil 200, the second metal foil 202 (not shown), and the third metal foil 204 (not shown) pressure bonded by the first pressure bonding roller 110 and the second pressure bonding roller 112 as viewed from the side of the first metal foil 200 side. A first boundary 300 is formed by the first protrusion 118a of the first pressure bonding roller 110 and the third protrusion of the second pressure bonding roller 112, and a second boundary 302 is formed by the second protrusion 118b of the first pressure bonding roller 110 and the fourth protrusion of the second pressure bonding roller 112. The first boundary 300 and the second boundary 302 are formed not only in the first metal foil 200 but also in the third metal foil 204. That is, each protrusion forms the first boundary 300 and the second boundary 302 by molding. In that process, the height of each protrusion is set as described above in consideration of the impact on the second metal foil 202.

Between the first boundary 300 and the second boundary 302, pressure bonding by the D-cut surface 116 of the first pressure bonding roller 110 and the D-cut surface (not shown) of the second pressure bonding roller 112 is performed. This portion represents an interval portion 212. In the other portions, on the other hand, pressure bonding is performed by the side surface 114 of the first pressure bonding roller 110 and the side surface (not shown) of the second pressure bonding roller 112. The pressure bonding force of the interval portion 212 is weaker than the pressure bonding force of the portions other than the interval portion 212. That is, pressure bonding of the first metal foil 200 through the third metal foil 204 and formation of the interval portion 212 are both performed in a series of steps.

FIG. 4B is a cross-sectional view in A-A' direction of FIG. 4A, that is, a cross-sectional view of the interval portion 212. A weakly pressure bonded portion 220 is provided between the first metal foil 200 and the second metal foil 202, and a weakly pressure bonded portion 220 is also provided between the second metal foil 202 and the third metal foil 204. The weakly pressure bonded portion 220 is a portion with a weak pressure bonding force.

As shown in FIG. 4A, a portion, of the first metal foil 200 and the third metal foil 204, in contact with one end of the second metal foil 202 is a third boundary 304, and a portion in contact with another end of the second metal foil 202 is a fourth boundary 306. The third boundary 304 and the fourth boundary 306 are also provided in the third metal foil 204. A portion outside the third boundary 304 is a first surplus portion 210a, and a portion outside the fourth boundary 306 is a second surplus portion 210b. The first surplus portion 210a and the second surplus portion 210b are collectively referred to as a surplus portion 210. The surplus portion 210 is a portion protruding from the second metal foil 202 and is a portion that does not adhere to the second metal foil 202.

FIG. 4C is a cross-sectional view in B-B' direction of FIG. 4A. The first metal foil 200, the second metal foil 202, and the third metal foil 204 are stacked, and the weakly pressure bonded portion 220 is not provided. FIG. 4D is a cross-sectional view in C-C' direction of FIG. 4A. As described above, the weakly pressure bonded portion 220 is provided only in the interval portion 212, and the weakly pressure bonded portion 220 is not provided in the portions other than the interval portion 212. FIGS. 4E-4H will be described later, and reference is made back to FIG. 2.

A first adhesive tape feed 120 has a first adhesive tape 240 wrapped around it. A second adhesive tape feed 122 has a second adhesive tape 242 wrapped around it. The first adhesive tape 240 is drawn from the first adhesive tape feed 120, and the second adhesive tape 242 is drawn from the second adhesive tape feed 122. The first adhesive tape 240 has a width equal to or greater than the width of the first metal foil 200 and has an adhesive surface on the side of the first metal foil 200. Further, the second adhesive tape 242 has a width equal to or greater than the width of the third metal foil 204 and has an adhesive surface on the third metal foil 204 side. The first adhesive tape 240, the laminated body of the first metal foil 200 through the third metal foil 204, and the second adhesive tape 242 travel toward a first pressing roller 130 and a second pressing roller 132 forming a pair of pressing rollers. In that process, the first adhesive tape 240, the laminated body of the first metal foil 200 through the third metal foil 204, and the second adhesive tape 242 are stacked in that order from top to bottom.

The first pressing roller 130 and the second pressing roller 132 are arranged in the vertical direction. To describe it specifically, the first pressing roller 130 is provided on the side of the first adhesive tape 240, and the second pressing roller 132 is provided on the side of the second adhesive tape 242. The first adhesive tape 240, the laminated body of the first metal foil 200 through the third metal foil 204, and the second adhesive tape 242 are inserted between the first pressing roller 130 and the second pressing roller 132. The first pressing roller 130 and the second pressing roller 132 have a cylindrical shape and are rotatable. The first adhesive tape 240 adheres to the first metal foil 200, and the second adhesive tape 242 adheres to the third metal foil 204 by the rotation of the first pressing roller 130 and the second pressing roller 132. A first adhesive tape take-up 140 takes up the first adhesive tape 240 from the first pressing roller 130 and the second pressing roller 132, and a second adhesive tape take-up 142 takes up the second adhesive tape 242 from the first pressing roller 130 and the second pressing roller 132.

By such adhesion between the first adhesive tape 240 and the first metal foil 200, the first adhesive tape 240 peels off the portion of the first metal foil 200 that has a weak pressure bonding force with respect to the second metal foil 202, i.e., the surplus portion 210 and the interval portion 212, from the first metal foil 200. Further, by adhesion between the second adhesive tape 242 and the third metal foil 204, the second adhesive tape 242 peels off the portion of the third metal foil 204 that has a weak pressure bonding force with respect to the second metal foil 202, i.e., the surplus portion 210 and the interval portion 212 from the third metal foil 204.

In the case the first pressure bonding roller 110 and the second pressure bonding roller 112 are not provided with the protrusion 118, the first boundary 300 and the second boundary 302 provided in the first metal foil 200 and the third metal foil 204 will have a small depth. If the depth of the first boundary 300 and the second boundary 302 is shallow, the boundary of the interval portion 212 will be difficult to peel off, and a warp may be created in the boundary of the interval portion 212 when the interval portion 212 is peeled off by the first adhesive tape 240 and the second adhesive tape 242. On the other hand, in the case the protrusion 118 provided in the first pressure bonding roller 110 and the second pressure bonding roller 112, as in this embodiment, the first boundary 300 and the second boundary 302 provided in the first metal foil 200 and the third metal foil 204 will have a large depth. Given a large depth of the first boundary 300 and the second boundary 302, the boundary of the interval portion 212 is easily peeled off, and a warp is created less easily in the boundary of the interval portion 212 when the interval portion 212 is peeled off by the first adhesive tape 240 and the second adhesive tape 242.

FIG. 4E shows a portion of the first metal foil 200 that has been peeled off by the first adhesive tape 240. As shown, the surplus portion 210 and the interval portion 212 are peeled off. The portion of the third metal foil 204 peeled off by the second adhesive tape 242 will also be as shown in FIG. 4E. FIG. 4F shows an electrode plate 280, i.e., a laminated body that remains after the first metal foil 200 and the third metal foil 204 as shown in FIG. 4E have been peeled off. The second metal foil 202 is exposed from a portion of the first metal foil 200. The second metal foil 202 is also exposed from a portion of the third metal foil 204, although it is not shown here. FIG. 4G is a D-D' cross-sectional view of FIG. 4F, which includes only the second metal foil 202. FIG. 4H is an E-E' cross-sectional view of FIG. 4F, in which the first metal foil 200, the second metal foil 202, and the third metal foil 204 are stacked. A plurality of second electrode plates 8 are produced by cutting the electrode plate 280 into a plurality of pieces.

According to this embodiment, the first pressure bonding roller 110 and the second pressure bonding roller 112 are provided with the D-cut surface 116 and the protrusion 118 so that pressure bonding of the first metal foil 200 through the third metal foil 204 and formation of the interval portion 212 are both performed in a series of steps. Further, pressure bonding of the first metal foil 200 through the third metal foil 204 and formation of the interval portion 212 are both performed in a series of steps so that misalignment is prevented when the interval portion 212 is formed. Further, misalignment is prevented when the interval portion 212 is formed so that the accuracy of manufacturing of the electrode plate 280 can be improved.

Further, the height of the protrusions in the first pressure bonding roller 110 and the second pressure bonding roller 112 are configured to be 20% to 70% of the thickness of the first metal foil 200 and the third metal foil 204 so that it is possible to reduce the impact on the second metal foil 202, while also ensuring a sufficient depth of the first boundary 300 and the second boundary 302.

Further, the timing of pressure bonding by the protrusion 118 of the first pressure bonding roller 110 and the timing of pressure bonding by the protrusion of the second pressure bonding roller 112 are synchronized so that the positions of the interval portions 212 in the first metal foil 200 and the third metal foil 204 can be aligned.

Embodiment 2

A description will now be given of embodiment 2. In the electrode plate 280 according to embodiment 1, the first metal foil 200 and the third metal foil 204 are pressure bonded to both surfaces of the second metal foil 202. In the electrode plate according to embodiment 2, on the other hand, the first metal foil 200 is pressure bonded to one surface of the second metal foil 202, and the third metal foil 204 is not pressure bonded to the second metal foil 202. The description below highlights a difference from embodiment 1.

Figure 5:
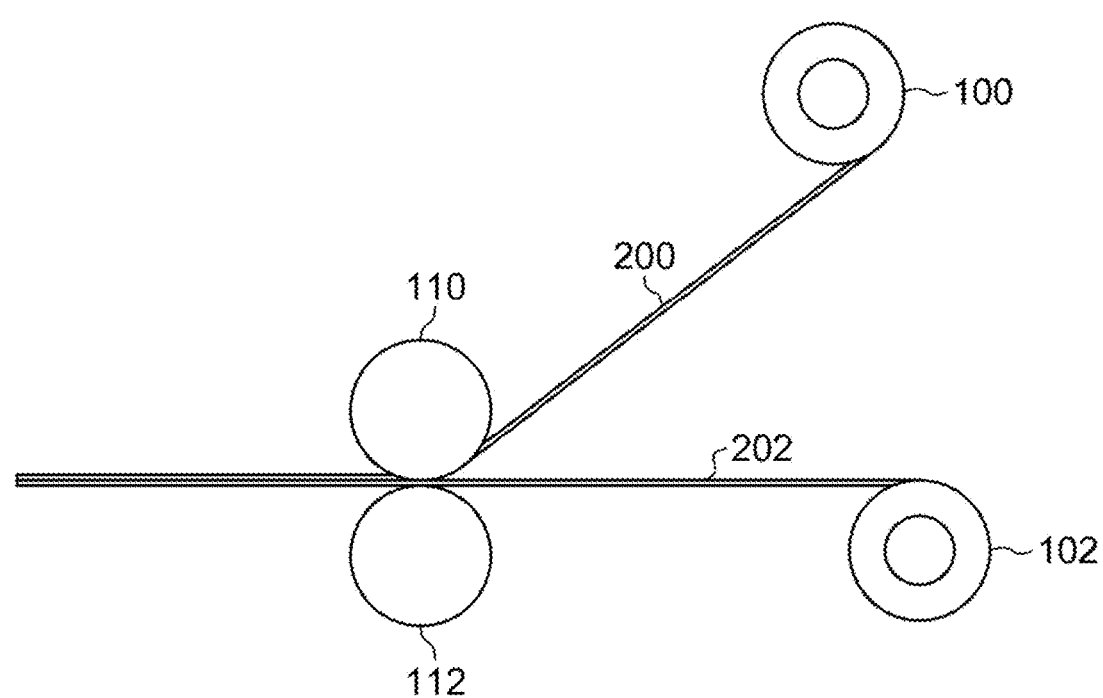
FIG. 5 is a side view showing a structure of a manufacturing apparatus according to embodiment 2.

FIG. 5 is a side view showing a structure of a manufacturing apparatus 182. The first metal foil roll member 100 and the second metal foil roll member 102 are the same as those of FIG. 2. The manufacturing apparatus 182 does not include the third metal foil roll member 104. The first metal foil 200 is drawn from the first metal foil roll member 100, and the second metal foil 202 is drawn from the second metal foil roll member 102. The first metal foil 200 and the second metal foil 202 travel toward the first pressure bonding roller 110 and the second pressure bonding roller 112 forming a pair of pressure bonding rollers. In that process, the first metal foil 200 and the second metal foil 202 are stacked from top to bottom in that order.

The first pressure bonding roller 110 and the second pressure bonding roller 112 are arranged in the vertical direction. To describe it specifically, the first pressure bonding roller 110 is provided on the side of the first metal foil 200, and the second pressure bonding roller 112 is provided on the side of the second metal foil 202. The first metal foil 200 and the second metal foil 202 stacked are inserted between the first pressure bonding roller 110 and the second pressure bonding roller 112. The first metal foil 200 and the second metal foil 202 are pressure bonded by the rotation of the first pressure bonding roller 110 and the second pressure bonding roller 112. As in embodiment 1, the first pressure bonding roller 110 is provided with the D-cut surface 116 and the protrusion 118. On the other hand, the second pressure bonding roller 112 is not provided with a D-cut surface and a protrusion, and a side surface (not shown) is provided.

The D-cut surface 116 and the protrusion 118 of the first pressure bonding roller 110 form the surplus portion 210 and the interval portion 212 in the first metal foil 200. The surplus portion 210 and the interval portion 212 are peeled off by the first adhesive tape 240.

According to this embodiment, the D-cut surface 116 and the protrusion 118 are provided in the first pressure bonding roller 110, and a D-cut surface is not provided in the second pressure bonding roller 112 so that pressure-bonding of the first metal foil 200 and the second metal foil 202 and formation of the interval portion 212 in the first metal foil 200 can both be performed in a series of steps. Further, pressure bonding of the first metal foil 200 and the third metal foil 204 and formation of the interval portion 212 in the first metal foil 200 are both performed in a series of steps so that misalignment is prevented when the interval portion 212 is formed. Further, misalignment is prevented when the interval portion 212 is formed so that the accuracy of manufacturing of the electrode plate 280 can be improved. Further, the height of the first pressure bonding roller 110 is configured to be 20% to 70% of the thickness of the first metal foil 200 so that it is possible to reduce the impact on the second metal foil 202, while also ensuring a sufficient depth of the first boundary 300 and the second boundary 302.

Embodiment 3

A description will now be given of embodiment 3. In embodiment 1, the first pressure bonding roller 110 and the second pressure bonding roller 112 is caused to pressure-bond the first metal foil 200 and the third metal foil 204 on both surfaces of the second metal foil 202 and to form the surplus portion 210 and the interval portion 212 in the first metal foil 200 and the third metal foil 204. In embodiment 3, the arrangement of the pressure bonding rollers is different from that of embodiment 1. The description below highlights a difference from the foregoing.

Figure 6:
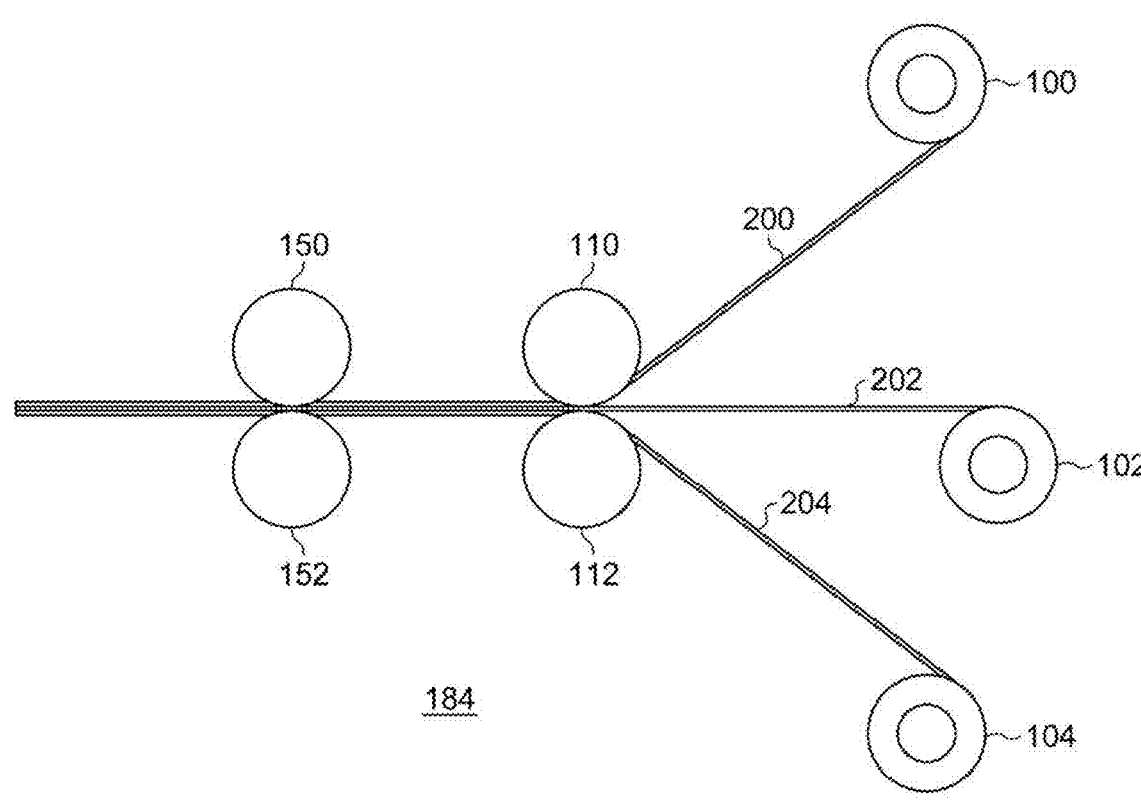
FIG. 6 is a side view showing a structure of a manufacturing apparatus according to embodiment 3.

FIG. 6 is a side view showing a structure of a manufacturing apparatus 184. The first metal foil roll member 100, the second metal foil roll member 102, and the third metal foil roll member 104 are as shown in FIG. 2. The first metal foil 200 is drawn from the first metal foil roll member 100, the second metal foil 202 is drawn from the second metal foil roll member 102, and the third metal foil 204 is drawn from the third metal foil roll member 104. The first metal foil 200, the second metal foil 202, and the third metal foil 204 travel toward the first pressure bonding roller 110 and the second pressure bonding roller 112 forming a pair of pressure bonding rollers. In that process, the first metal foil 200, the second metal foil 202, and the third metal foil 204 are stacked from top to bottom in that order.

The first pressure bonding roller 110 and the second pressure bonding roller 112 are arranged in the vertical direction. To describe it specifically, the first pressure bonding roller 110 is provided on the side of the first metal foil 200, and the second pressure bonding roller 112 is provided on the side of the third metal foil 204. The first metal foil 200, the second metal foil 202, and the third metal foil 204 stacked are inserted between the first pressure bonding roller 110 and the second pressure bonding roller 112. The first pressure bonding roller 110 and the second pressure bonding roller 112 have a cylindrical shape and are rotatable. The first metal foil 200, the second metal foil 202, and the third metal foil 204 are pressure bonded by the rotation of the first pressure bonding roller 110 and the second pressure bonding roller 112. As in embodiment 1, the first pressure bonding roller 110 is provided with the D-cut surface 116 and the protrusion 118. On the other hand, the second pressure bonding roller 112 is not provided with a D-cut surface and a protrusion, and a side surface (not shown) is provided. The D-cut surface 116 and the protrusion 118 of the first pressure bonding roller 110 form the surplus portion 210 and the interval portion 212 in the first metal foil 200.

When the first pressure bonding roller 110 and the second pressure bonding roller 112 are defined as a pair of pressure bonding rollers in the front stage, a third pressure bonding roller 150 and a fourth pressure bonding roller 152 are referred to as a pair of pressure bonding rollers in the rear stage. The first metal foil 200, the second metal foil 202, and the third metal foil 204 that are pressure bonded travel toward the third pressure bonding roller 150 and the fourth pressure bonding roller 152 forming a pair of pressure bonding rollers.

The third pressure bonding roller 150 and the fourth pressure bonding roller 152 are arranged in the vertical direction. To describe it specifically, the third pressure bonding roller 150 is provided on the side of the first metal foil 200, and the fourth pressure bonding roller 152 is provided on the side of the third metal foil 204. The first metal foil 200, the second metal foil 202, and the third metal foil 204 that are pressure bonded are inserted between the third pressure bonding roller 150 and the fourth pressure bonding roller 152. The third pressure bonding roller 150 and the fourth pressure bonding roller 152 have a cylindrical shape and are rotatable. The first metal foil 200, the second metal foil 202, and the third metal foil 204 are further pressure bonded by the rotation of the third pressure bonding roller 150 and the fourth pressure bonding roller 152.

The third pressure bonding roller 150 is not provided with a D-cut surface and a protrusion, and a side surface (not shown) is provided. On the other hand, a D-cut surface (not shown) and a protrusion (not shown) are provided in a portion of the side surface (not shown) of the fourth pressure bonding roller 152. The D-cut surface and the protrusion of the fourth pressure bonding roller 152 form the surplus portion 210 and the interval portion 212 in the third metal foil 204. The area of the D-cut surface 116 in the first pressure bonding roller 110 of embodiment 1 is the same as the area of the D-cut surface in the second pressure bonding roller 112. Therefore, the area of the interval portion 212 provided in the first metal foil 200 and the area of the interval portion 212 provided in the third metal foil 204 are also the same. On the other hand, the area of the D-cut surface 116 in the first pressure bonding roller 110 of embodiment 3 may be smaller than the area of the D-cut surface in the fourth pressure bonding roller 152. Therefore, the area of the interval portion 212 provided in the first metal foil 200 may be smaller than the area of the interval portion 212 provided in the third metal foil 204.

According to this embodiment, the third pressure bonding roller 150 and the fourth pressure bonding roller 152 are provided to follow the first pressure bonding roller 110 and the second pressure bonding roller 112, formation of the interval portion 212 in the first metal foil 200 and formation of the interval portion 212 in the third metal foil 204 can be timed differently. Further, formation of the interval portion 212 in the first metal foil 200 and formation of the interval portion 212 in the third metal foil 204 are timed differently so that the flexibility in the configuration can be improved. Further, the area of the D-cut surface 116 in the first pressure bonding roller 110 is configured to be smaller than the area of the D-cut surface in the fourth pressure bonding roller 152 so that the area of the interval portion 212 in the first metal foil 200 can be configured to be smaller than the area of the interval portion 212 in the third metal foil 204. Further, the area of the interval portion 212 in the first metal foil 200 is configured to be smaller than the area of the interval portion 212 in the third metal foil 204 so that the flexibility in the configuration can be improved. Further, the height of the protrusions in the first pressure bonding roller 110 and the fourth pressure bonding roller 152 are configured to be 20% to 70% of the thickness of the first metal foil 200 and the third metal foil 204 so that it is possible to reduce the impact on the second metal foil 202, while also ensuring a sufficient depth of the first boundary 300 and the second boundary 302.

The embodiments of the present disclosure are described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the present disclosure defined by the claims. New embodiments with design modifications will provide the combined advantages of the embodiment and the variation. Although the details subject to such design modification are emphasized in the embodiment described above by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

The embodiments may be defined by the following items.

[Item 1]
A manufacturing apparatus (180, 182, 184) including:
a pair of pressure bonding rollers each having a cylindrical shape,
wherein a first metal foil (200) and a second metal foil (202) stacked are inserted between the pair of rollers,
wherein the first metal foil (200) and the second metal foil (202) are pressure bonded by a rotation of the pair of pressure bonding rollers,
wherein the pair of pressure bonding rollers include a first pressure bonding roller (110) provided on a side of the first metal foil (200) and a second pressure bonding roller (112) different from the first pressure bonding roller (110),
wherein the first pressure bonding roller (110) includes a D-cut surface (116) at least in a portion of the cylindrical shape, and
wherein a protrusion (118) is provided in each of two boundaries between a side surface (114) and the D-cut surface (116) of the cylindrical shape in the first pressure bonding roller (110).

[Item 2]
The manufacturing apparatus (180, 182, 184) according to Item 1,
wherein a height of the protrusion (118) of the first pressure bonding roller (110) is 20% to 70% of a thickness of the first metal foil (200).

[Item 3]
The manufacturing apparatus (180, 182, 184) according to Item 1 or Item 2,
wherein the first metal foil (200) and the second metal foil (202) are different metals.

[Item 4]
The manufacturing apparatus (180) according to Item 1,
wherein the first metal foil (200), the second metal foil (202), and a third metal foil (204) stacked are inserted between the pair of rollers,
wherein the first metal foil (200), the second metal foil (202), and the third metal foil (204) are pressure bonded by a rotation of the pair of pressure bonding rollers,
wherein the second pressure bonding roller (112) of the pair of pressure bonding rollers is provided on a side of the third metal foil (204),
wherein the second pressure bonding roller (112) includes a D-cut surface (116) at least in a portion of the cylindrical shape, and
wherein a protrusion (118) is provided in each of two boundaries between a side surface (114) and the D-cut surface (116) of the cylindrical shape in the second pressure bonding roller (112).

[Item 5]
The manufacturing apparatus (180) according to Item 1,
wherein, in the pair of pressure bonding rollers rotated, a timing of pressure bonding by the protrusion (118) of the first pressure bonding roller (110) and a timing of pressure bonding by the protrusion (118) of the second pressure bonding roller (112) are synchronized.

[Item 6]
The manufacturing apparatus (180) according to Item 4 or Item 5,
wherein a height of the protrusion (118) of the first pressure bonding roller (110) is 20% to 70% of a thickness of the first metal foil (200), and

wherein a height of the protrusion (118) of the second pressure bonding roller (112) is 20% to 70% of a thickness of the third metal foil (204).

[Item 7]

The manufacturing apparatus (184) according to Item 1, wherein, when the pair of pressure bonding rollers is defined as a pair of pressure bonding rollers in a front stage, a pair of pressure bonding rollers in a rear stage each having a cylindrical shape is further provided to follow the pair of pressure bonding rollers in the front stage, wherein the first metal foil (200), the second metal foil (202), and a third metal foil (204) stacked are inserted between the pair of rollers, wherein the first metal foil (200), the second metal foil (202), and the third metal foil (204) are pressure bonded by a rotation of the pair of pressure bonding rollers, wherein the second pressure bonding roller (112) of the pair of pressure bonding rollers is provided on a side of the third metal foil (204), wherein the first metal foil (200), the second metal foil (202), and the third metal foil (204) pressure bonded by the pair of pressure bonding rollers in the front stage are inserted between the pair of pressure bonding rollers in the rear stage, wherein the first metal foil (200), the second metal foil (202), and the third metal foil (204) are further pressure bonded by a rotation of the pair of pressure bonding rollers in the rear stage, wherein the pair of pressure bonding rollers in the rear stage include a third pressure bonding roller (150) provided on a side of the first metal foil (200) and a fourth pressure bonding roller (152) provided on a side of the third metal foil (204), wherein the fourth pressure bonding roller (152) includes a D-cut surface (116) at least in a portion of the cylindrical shape, and wherein a protrusion (118) is provided in each of two boundaries between a side surface (114) and the D-cut surface (116) of the cylindrical shape in the fourth pressure bonding roller (152).

[Item 8]

The manufacturing apparatus (184) according to Item 7, wherein an area of the D-cut surface (116) in the first pressure bonding roller (110) is smaller than an area of the D-cut surface (116) in the fourth pressure bonding roller (152).

[Item 9]

The manufacturing apparatus (184) according to any one of Item 4 to Item 8, wherein a height of the protrusion (118) of the first pressure bonding roller (110) is 20% to 70% of a thickness of the first metal foil (200), and wherein a height of the protrusion (118) of the fourth pressure bonding roller (152) is 20% to 70% of a thickness of the third metal foil (204).

[Item 10]

The manufacturing apparatus (180, 184) according to any one of Item 4 to Item 9, wherein the first metal foil (200) and the second metal foil (202) are different metals, and the first metal foil (200) and the third metal foil (204) are the same metal.

14

INDUSTRIAL APPLICABILITY

According to the present disclosure, manufacturing accuracy of an electrode plate can be improved.

REFERENCE SIGNS LIST

A width direction, B radial direction, C central axis of the winding, D direction of winding, 1 cylindrical battery, 2 electrode group, 4 outer can, 6 first electrode plate, 8 second electrode plate, 10 separator, 12 first electrode core member, 14 second electrode core member, 20 first current collector plate, 22 second current collector plate, 24 insulating gasket, 26 sealing plate, 30 first welded part, 32 second welded part, 100 first metal foil roll member, 102 second metal foil roll member, 104 third metal foil roll member, 110 first pressure bonding roller, 112 second pressure bonding roller, 114 side surface, 116 D-cut surface, 118 protrusion, 120 first adhesive tape feed, 122 second adhesive tape feed, 130 first pressing roller, 132 second pressing roller, 140 first adhesive tape take-up, 142 second adhesive tape take-up, 150 third pressure bonding roller, 152 fourth pressure bonding roller, 180, 182, 184 manufacturing apparatus, 200 first metal foil, 202 second metal foil, 204 third metal foil, 210 surplus portion, 212 interval portion, 220 weakly pressure bonded portion, 240 first adhesive tape, 242 second adhesive tape, 280 electrode plate, 300 first boundary, 302 second boundary, 304 third boundary, 306 fourth boundary

The invention claimed is:

1. A manufacturing apparatus comprising:
a pair of pressure bonding rollers each having a cylindrical shape,
wherein a first metal foil and a second metal foil stacked are inserted between the pair of rollers,
wherein the first metal foil and the second metal foil are pressure bonded by a rotation of the pair of pressure bonding rollers,
wherein the pair of pressure bonding rollers include a first pressure bonding roller provided on a side of the first metal foil and a second pressure bonding roller different from the first pressure bonding roller,
wherein the first pressure bonding roller includes a D-cut surface at least in a portion of the cylindrical shape, and
wherein a protrusion is provided in each of two boundaries between a side surface and the D-cut surface of the cylindrical shape in the first pressure bonding roller.

2. The manufacturing apparatus according to claim 1, wherein a height of the protrusion of the first pressure bonding roller is 20% to 70% of a thickness of the first metal foil.

3. The manufacturing apparatus according to claim 1, wherein the first metal foil and the second metal foil are different metals.

4. The manufacturing apparatus according to claim 1, wherein the first metal foil, the second metal foil, and a third metal foil stacked are inserted between the pair of rollers,
wherein the first metal foil, the second metal foil, and the third metal foil are pressure bonded by a rotation of the pair of pressure bonding rollers,
wherein the second pressure bonding roller of the pair of pressure bonding rollers is provided on a side of the third metal foil,
wherein the second pressure bonding roller includes a D-cut surface at least in a portion of the cylindrical shape, and wherein a protrusion is provided in each of two boundaries between a side surface and the D-cut surface of the cylindrical shape in the second pressure bonding roller.

5. The manufacturing apparatus according to claim 4, wherein, in the pair of pressure bonding rollers rotated, a timing of pressure bonding by the protrusion of the first pressure bonding roller and a timing of pressure bonding by the protrusion of the second pressure bonding roller are synchronized.

6. The manufacturing apparatus according to claim 4, wherein a height of the protrusion of the first pressure bonding roller is 20% to 70% of a thickness of the first metal foil, and wherein a height of the protrusion of the second pressure bonding roller is 20% to 70% of a thickness of the third metal foil.

7. The manufacturing apparatus according to claim 1, wherein, when the pair of pressure bonding rollers is defined as a pair of pressure bonding rollers in a front stage, a pair of pressure bonding rollers in a rear stage each having a cylindrical shape is further provided to follow the pair of pressure bonding rollers in the front stage, wherein the first metal foil, the second metal foil, and a third metal foil stacked are inserted between the pair of rollers, wherein the first metal foil, the second metal foil, and the third metal foil are pressure bonded by a rotation of the pair of pressure bonding rollers, wherein the second pressure bonding roller of the pair of pressure bonding rollers is provided on a side of the third metal foil, wherein the first metal foil, the second metal foil, and the third metal foil pressure bonded by the pair of pressure bonding rollers in the front stage are inserted between the pair of pressure bonding rollers in the rear stage, wherein the first metal foil, the second metal foil, and the third metal foil are further pressure bonded by a rotation of the pair of pressure bonding rollers in the rear stage, wherein the pair of pressure bonding rollers in the rear stage include a third pressure bonding roller provided on a side of the first metal foil and a fourth pressure bonding roller provided on a side of the third metal foil, wherein the fourth pressure bonding roller includes a D-cut surface at least in a portion of the cylindrical shape, and wherein a protrusion is provided in each of two boundaries between a side surface and the D-cut surface of the cylindrical shape in the fourth pressure bonding roller.

8. The manufacturing apparatus according to claim 7, wherein an area of the D-cut surface in the first pressure bonding roller is smaller than an area of the D-cut surface in the fourth pressure bonding roller.

9. The manufacturing apparatus according to claim 7, wherein a height of the protrusion of the first pressure bonding roller is 20% to 70% of a thickness of the first metal foil, and wherein a height of the protrusion of the fourth pressure bonding roller is 20% to 70% of a thickness of the third metal foil.

10. The manufacturing apparatus according to claim 4, wherein the first metal foil and the second metal foil are different metals, and the first metal foil and the third metal foil are the same metal.

* * * * *